Figure 1:
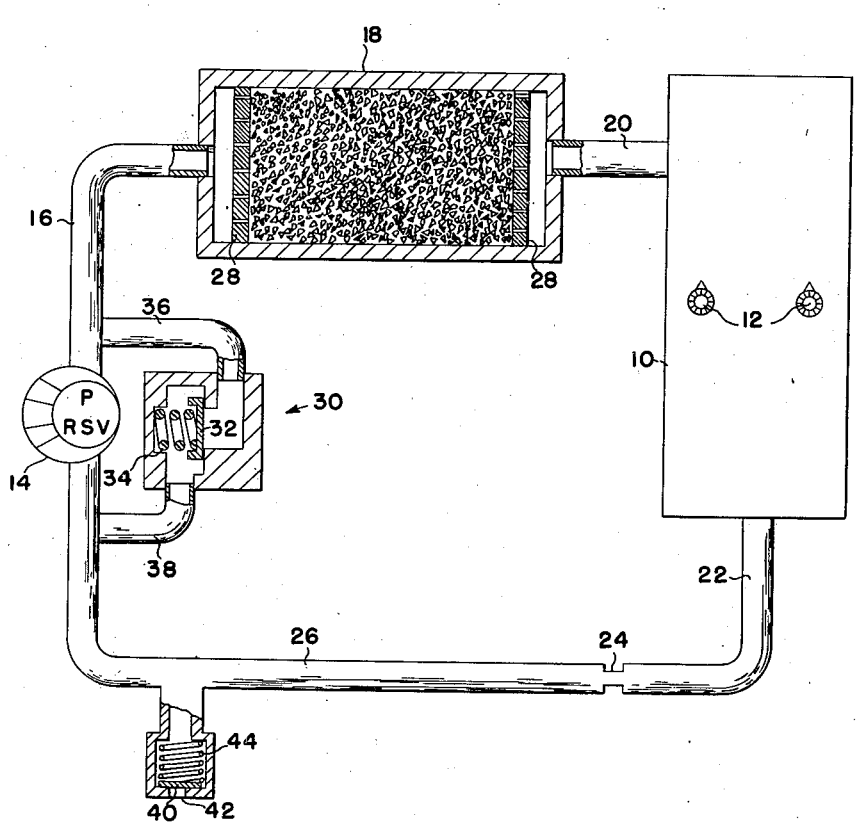

March 22, 1949. H. A. LOCKWOOD 2,465,162
DEHYDRATING SYSTEM
Filed Dec. 12, 1945

INVENTOR
HARRY A. LOCKWOOD
BY Lester W Clark
Agent

Patented Mar. 22, 1949

2,465,162

UNITED STATES PATENT OFFICE 2,465,162

DEHYDRATING SYSTEM

Harry A. Lockwood, Meriden, Conn., assignor, by mesne assignments, to Niles-Bement-Pond Company, West Hartford, Conn., a corporation of New Jersey Application December 12, 1945, Serial No. 634,578

4 Claims. (Cl. 98—1.5)

1

The present invention relates to a system for dehydrating and maintaining dehydrated a chamber which is subject to leakage of external air. The present invention may, for example, be applied to a cabinet containing electronic circuits or other devices whose characteristics vary with humidity, so that it is necessary to keep the interior of the cabinet dry. Such units frequently have control shafts or other small openings from the interior of the cabinets to the outside air, so that leakage of air into the cabinet may occur due to changes in atmospheric pressure. Since the outside air almost always contains some moisture, it is necessary to provide means for dehydrating the interior of the cabinet in order that such moisture will not adversely affect the operation of the devices contained therein.

It is therefore an object of the present invention to provide a system for circulating dehydrated air thru a substantially closed chamber.

Another object is to provide such a system in which the chamber is maintained at a pressure somewhat above atmospheric so that any leakage will be from the chamber to the outside air.

A further object is to provide, in a system of the type described, makeup valve means whereby any air lost thru leakage to the outside is made up so that the pressure inside the circulating system is maintained constant.

Other objects and advantages of the present invention will become apparent from a consideration of the appended specification, claims and drawings, in which the single figure represents, somewhat diagrammatically, a dehydrating system embodying the principles of my invention.

Referring to the drawing, there is shown a casing 10 of a unit to be dehydrated. In the usual unit being dehydrated by a system of this type, there is some leakage path from the inside of the casing to the outside air. As a common example of such a leakage path, I have shown a pair of control knobs 12, mounted on the front of the casing. The shafts extending from these knobs into the casing are not perfectly sealed, so that the interior of the casing is in restricted communication with the outside air.

A pump 14 is provided for supplying air under pressure to the casing 10. The air discharged by pump 14 passes thru a conduit 16, a dehydrating unit 18 and a conduit 20 to the interior of the casing 10. Upon leaving the casing 10, the air passes thru a conduit 22, a restriction 24, and a conduit 26 to the inlet of the pump 14.

The dehydrating unit 18 consists of a chamber having a filter or screen 28 at each end thereof. The filter at the inlet end may be omitted, if desired. The space between the screens is filled with suitable dehydrating material. For this purpose I prefer to use silica gel but other materials may be used in its place.

2

A relief valve for the pump 14 is generally indicated at 30. In the particular form shown in the drawing, this valve comprises a single disc 32 biased closed by a spring 34. A conduit 36 connects the discharge side of the pump 14 to the space appearing at the right of valve 32 in the drawing. The space at the left of valve 32 is connected thru a conduit 38 to the inlet side of the chamber 14. The relief valve 32 works in a well-known manner to maintain a substantially constant pressure differential between the pump inlet and discharge. This pressure differential is determined by the strength of spring 34. If the pressure differential increases to a point at which it overcomes the spring 34 and opens valve 32, the pressure is relieved by that opening movement to reduce the pressure differential. In practice, the valve 32 will nearly always be slightly open since the capacity of the pump will be designed greater than necessary to take care of the circulation of the system in which it is connected. The spring 34 may be provided with means for adjusting its tension so as to regulate the pressure differential maintained across the pump 14.

A certain pressure drop takes place thru the dehydrating unit 18, due to the circulation of air therethru. A smaller pressure drop takes place thru the casing 10, since the path of air flow thru that casing is somewhat less restrictive. The points of connection of conduits 20 and 22 to the casing will be chosen so that free circulation of air thru the casing is permitted. The restriction 24 is placed between conduits 22 and 26 so that a relatively high pressure drop will take place across that restriction. In this way the pressure in the casing 10 may be maintained somewhat greater than atmospheric, while the pressure in the conduit 26 on the downstream side of restriction 24 is somewhat less than atmospheric. The pressure in conduit 26 is maintained at a predetermined difference below atmospheric pressure by means of a makeup valve 40, which is a simple disc valve closing an aperture 42, and biased to closed position by spring 44. If the pressure in conduit 26 falls below atmospheric by a sufficient amount, the difference between that pressure and the atmospheric pressure will overcome the spring 44 and admit air from the outside to enter the conduit 26 and reduce the difference in pressure until the force of spring 44 is again sufficient to close valve 40.

Since there is a steady leakage of air from the casing 10, it will be necessary for the system to recover air from the atmosphere thru the valve 40 to make up for that steady leakage. Also, the valve 40 permits the pressure within the system to follow changes in atmospheric pressure so that the pressure in the casing 10 is always maintained above atmospheric.

Means may be provided for adjusting the tension of spring 44, if desired. By properly choosing the forces of springs 34 and 44, and the dimensions of restriction 24, the results described may be obtained. The pressure rise thru the pump should be relatively great as compared to the pressure difference maintained by valve 40. Also, the restriction 24 should be sufficiently small so that the pressure drop thru it constitutes the major portion of the pressure drop between the pump outlet and pump inlet thru the dehydrating unit 18 and the casing 10.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. A system for maintaining the air in a substantially closed chamber in a dehydrated condition, comprising a pump, a container filled with dehydrating material, a discharge conduit leading from said pump to said container, a conduit leading from said container to said chamber, a conduit leading from said chamber to the inlet of said pump, a restriction in said last-mentioned conduit, a by-pass conduit connecting the outlet to the inlet of said pump, a relief valve in said by-pass conduit for maintaining a first substantially constant pressure differential between the outlet and inlet of said pump, and a valve, connected to said last-mentioned conduit between said restriction and the inlet of said pump, for admitting outside air to said inlet to maintain a second substantially constant pressure differential, lower than said first differential, between the outside atmosphere and the inlet of said pump.

2. Apparatus for maintaining the air in a chamber subject to leakage in a dehydrated condition, comprising a pump, dehydrating means, conduit means for conveying air discharged from said pump to said dehydrating means, thence to said chamber and back to said pump, a restriction in said conduit means between said chamber and the inlet of said pump, a by-pass conduit between the outlet and inlet of said pump, a first valve in said by-pass conduit movable in an opening direction by the pressure differential across said pump, a spring biasing said valve to closed position, said valve and spring cooperating to maintain said pressure differential at a substantially constant predetermined value, and a second valve, connected to said conduit means between said restriction and the inlet of said pump, for admitting air to said pump inlet from the atmosphere, said second valve being movable in an opening direction by the differential between atmospheric pressure and said pump inlet pressure whenever atmospheric pressure exceeds said inlet pressure, a second spring biasing said second valve closed, said second valve and spring cooperating to maintain said last-mentioned pressure differential at a value lower than said pressure differential across the pump, said valves, said springs and said restriction being so related that the pressure in said chamber is always maintained above atmospheric, whereby any leakage is of dehydrated air outwardly from said chamber and not of atmospheric air into said chamber.

3. Air circulating apparatus for connection to a substantially closed system subject to leakage, comprising a pump, an outlet connection for said pump, an inlet connection for said pump, said connections being adapted to connect said pump to said system, a restriction in said inlet connection, a by-pass conduit connecting the outlet to the inlet of said pump, a relief valve in said by-pass conduit responsive to the pressure differential between the inlet and outlet of said pump to maintain said pressure differential at a substantially constant predetermined value, and a second valve connected to said inlet connection for admitting air from the atmosphere to said pump inlet downstream from said restriction to maintain the differential between atmospheric pressure and said pump inlet pressure at a second lower value, said valves and said restriction being so related that the pressure in said system is always maintained above atmospheric, whereby any leakage of air is outwardly from said system and not of atmospheric air into said system.

4. Air circulating apparatus for connection to a substantially closed system subject to leakage, comprising a pump, an inlet connection for said pump, an outlet connection for said pump, said connections being adapted to connect said pump to said system, a restriction in said inlet connection, a by-pass conduit connecting the outlet and the inlet of said pump, a first valve in said by-pass conduit movable in an opening direction by the pressure differential across said pump, a first spring biasing said valve to closed position, said valve and spring cooperating to maintain said pressure differential at a substantially constant predetermined value, and a second valve connected to said inlet connection for admitting air from the atmosphere to said pump inlet downstream from said restriction, said second valve being movable in an opening direction by the differential between atmospheric pressure and said pump inlet pressure whenever atmospheric pressure exceeds said inlet pressure, a second spring biasing said second valve closed, said second valve and spring cooperating to maintain said last-mentioned pressure differential at a value lower than said pressure differential across the pump, said springs, said valves and said restriction being so related that the pressure in said chamber is always maintained above atmospheric pressure, whereby any leakage is of dehydrated air outwardly from said chamber and not of atmospheric air into said chamber.

HARRY A. LOCKWOOD.

REFERENCES CITED

The following references are of record in the file of this patent:

UNITED STATES PATENTS

| Number | Name | Date |
|---|---|---|
| 859,156 | Warnken | July 2, 1907 |
| 1,152,400 | Dennedy | Sept. 7, 1915 |
| 1,378,028 | Hart | May 17, 1921 |
| 1,415,010 | Benjamin | May 9, 1922 |
| 1,642,577 | Carson | Sept. 13, 1927 |
| 1,670,656 | Fleisher | May 22, 1928 |
| 1,896,984 | Taylor | Feb. 7, 1933 |
| 2,125,646 | Nessell | Aug. 2, 1938 |
| 2,281,560 | Dew et al. | May 5, 1942 |

FOREIGN PATENTS

| Number | Country | Date |
|---|---|---|
| 510,046 | Great Britain | July 26, 1939 |